(12) United States Patent
Shimoda et al.

(10) Patent No.: US 7,619,020 B2
(45) Date of Patent: Nov. 17, 2009

(54) POLYACETAL RESIN COMPOSITION

(75) Inventors: Akihide Shimoda, Fuji (JP); Hiraku Iketani, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 134 days.

(21) Appl. No.: 11/882,979

(22) Filed: Aug. 8, 2007

(65) Prior Publication Data

US 2008/0039567 A1  Feb. 14, 2008

(30) Foreign Application Priority Data

Aug. 11, 2006  (JP) .............................. 2006-219838

(51) Int. Cl.
*C08K 3/38* (2006.01)
*C08L 61/02* (2006.01)

(52) U.S. Cl. ....................... 524/405; 524/438; 524/512; 524/593; 524/847; 525/402

(58) Field of Classification Search ................... 524/405
See application file for complete search history.

(56) References Cited

U.S. PATENT DOCUMENTS

| | | | | |
|---|---|---|---|---|
| 5,777,019 | A | * | 7/1998 | Anada .......................... 524/404 |
| 6,136,902 | A | * | 10/2000 | Fukasawa et al. ............. 524/128 |
| 2005/0182200 | A1 | * | 8/2005 | Kawaguchi et al. .......... 525/398 |
| 2006/0058457 | A1 | * | 3/2006 | Kawaguchi .................. 524/593 |

FOREIGN PATENT DOCUMENTS

| | | |
|---|---|---|
| EP | 0 765 910 A2 | 4/1997 |
| EP | 1 508 592 A1 | 2/2005 |
| EP | 1 630 198 A1 | 3/2006 |
| JP | 62091551 A2 | 10/1985 |
| JP | 61236851 A | 10/1986 |
| JP | 09176443 | 8/1997 |
| JP | 09151298 A | 10/1997 |
| WO | 2004/083304 | 9/2004 |
| WO | 2006/025547 | 3/2006 |

OTHER PUBLICATIONS

European Search Report; dated Sep. 20, 2007 (EP 07 25 3115).
European Search Report; dated Jul. 15, 2004 (PCT/EP2004/002584).

* cited by examiner

*Primary Examiner*—Marc S Zimmer
*Assistant Examiner*—Nicole M Buie
(74) *Attorney, Agent, or Firm*—Nixon & Vanderhye P.C.

(57) ABSTRACT

The present invention provides a polyacetal resin composition having excellent mechanical characteristics with reduced generation of formaldehyde. To 100 parts by weight of (A1) a polyacetal resin having substantially straight chain molecular structure, there are added 0.1-20 parts by weight of (A2) a polyacetal resin having a branched or cross-linked molecular structure, 3-200 parts by weight of (B) a glass-base inorganic filler, and 0.001 to 3 parts by weight of (C) a boric acid compound.

10 Claims, No Drawings

POLYACETAL RESIN COMPOSITION

This application is a U.S. utility application claiming priority to JP 2006-219838 filed Aug. 11, 2006, the entire content of which is hereby incorporated by reference.

TECHNICAL FIELD

The present invention relates to polyacetal resin compositions excellent in mechanical characteristic features, and more particularly relates to the polyacetal resin compositions excellent in mechanical characteristic features with reduced generation of formaldehyde.

BACKGROUND ART

Combinations of a glass-base inorganic filler material and the polyacetal resins to improve the mechanical strength have been known. However, the polyacetal resin is poor in chemical activity and a mere combination of the polyacetal resin with the glass-base inorganic filler material followed by melting and kneading could not obtain sufficient additional strength and rather might cause declined mechanical strength than non-reinforced polyacetal resin without blending these filler materials.

Application of surface treated glass-base inorganic filler materials with such as epoxy compounds, silane compounds and titanate compounds, or combination of these compounds with the glass-base inorganic filler materials have been proposed (JP-A 62-91551 and JP-A 61-236851).

Furthermore, additions of the glass-base inorganic filler material and a boric acid compound to the polyacetal resin to improve its mechanical strength were proposed (JP-A 9-151298 and JP-A 9-176443).

DISCLOSURE OF THE INVENTION

Neither sufficient improvement of the mechanical strength of polyacetal resin had been accomplished by combinations of the surface treated glass-base inorganic filler materials with such as epoxy compounds, silane compounds or titanate compounds, or combination of these compounds with the glass-base inorganic filler materials, nor satisfactory results could be obtained as shown in JP-A 62-91551 and JP-A 61-236851.

While, additions of the glass-base inorganic filler material and the boric acid compound to the polyacetal resin made some improvement in its mechanical strength as shown in JP-A 9-151298 and JP-A 9-176443, however, no response to the recent demands for the high mechanical strength was still obtained in some cases.

In addition, a recent trend for maximum decrease of a trace amount of components such as formaldehyde released from the polyacetal resin materials or their molded articles is strongly urged in view of environmental hygiene together with the demand for the improvement of mechanical strength of the polyacetal resin, and no sufficient mechanical strength could be provided by these combinations accompanying the improvement of quality of the polyacetal resin itself.

This may be caused by a decreased amount of active terminal groups such as hydroxy group in the polyacetal resin accompanied by the quality improvement of the polyacetal resin itself and addition of the boric acid compound still could not give sufficient adhesiveness to the glass-base inorganic filler material and the polyacetal resin, and resulted in difficulty in the improvement of mechanical strength.

Furthermore, the boric acid compounds sometimes generate formaldehyde by decomposition of a part of the acid labile polyacetal resin, particularly its unstable terminal.

As explained above, with conventional publicly known methods it was difficult to give high mechanical strength to the polyacetal resin and furthermore compatible addition of excellent mechanical strength to the polyacetal resin and decrease of generation of such as formaldehyde became more difficult.

The present invention aims to solve these conventional technical requirements and provide the polyacetal resin materials with par excellence mechanical strength and the polyacetal resin materials with both various stabilities under overwhelming recent demands, particularly decrease of formaldehyde, and par excellence mechanical strength.

The present inventor has earnestly studied and solved these problems to obtain the polyacetal resin composition having above mentioned excellent characteristic features and has confirmed the particular composition markedly improves these requirements, thus resulting in accomplishment of the present invention.

That is, the present invention relates to a polyacetal resin composition containing 100 parts by weight of (A1) a polyacetal resin having substantially straight chain molecular structure; 0.1-20 parts by weight of (A2) a polyacetal resin having a branched or cross-linked molecular structure; 3-200 parts by weight of (B) a glass-base inorganic filler; and 0.001 to 3 parts by weight of (C) a boric acid compound.

The present invention then provides a polyacetal resin composition obtained by blending 100 parts by weight of (A1) a polyacetal resin having a substantially straight chain molecular structure; 0.1-20 parts by weight of (A2) a polyacetal resin having a branched or cross-linked molecular structure; 3-200 parts by weight of (B) a glass-base inorganic filler; and 0.001 to 3 parts by weight of (C) a boric acid compound.

The polyacetal resin composition with par excellence mechanical strength can be provided by the present invention.

In addition, the polyacetal resin composition with par excellence mechanical strength and reduced generation of formaldehyde can be provided.

DETAILED EXPLANATION OF THE INVENTION

Hereinafter, the present invention will be explained.

At first, the (A1) polyacetal resin having a substantially straight chain molecular structure used in the present invention is a polymer compound with a main structural unit of oxymethylene group (—$CH_2O$—), and a polyacetal homopolymer composed of a substantially sole repetition unit of the oxymethylene group or a polyacetal copolymer having a little amount of a straight chain structural unit other than the oxymethylene group, for example oxyalkylene unit having 2-6 carbon atom, are enumerated as a typical example of the (A1) polyacetal resin. In addition, a block copolymer composed of a polymer unit with a repetition of oxymethylene group and the other polymer unit is also included.

Any (A1) polyacetal resin shown above can be used and two or more straight chain polyacetal resins having different characteristic features may be blended and used, however, the polyacetal copolymer can be preferably used in view of such as moldability and thermal stability.

Such a polyacetal copolymer product prepared by copolymerization of 99.95-80.0% by weight of (a) trioxane and 0.05-20.0% by weight of (b) a compound selected from a mono-functional cyclic ether compound having no substituent and a mono-functional cyclic formal compound having no substituent is preferable, and a copolymerized product of 99.9-90.0% by weight of (a) trioxane and 0.1-10.0% by weight of the (b) compound is more preferable. A polyacetal copolymer having melt indices (determined at 190° C. and 2.16 kg of load) in a range from one to 50 g/min is preferable.

Comonomer components (above (b) compound) used for the production of polyacetal copolymer include compounds without formation of branched or cross-linked molecular structure by ring-opening polymerization. As these compounds, for example, ethylene oxide, 1,3-dioxolane, diethylene glycol formal, 1,4-butanediol formal, 1,3-dioxane and propylene oxide may be enumerated, and particularly, one, two or more compound(s) selected from ethylene oxide, 1,3-dioxolane, 1,4-butanediol formal and diethylene glycol formal are preferable.

The preparation method of the (A1) polyacetal resin is not restrictive and may be prepared by publicly known methods.

Then, the (A2) polyacetal resin having branched or cross-linked molecular structure used in the present invention can be obtained by adding a compound being capable to copolymerize with formaldehyde or trioxane and form a branched unit or a cross-linked unit to monomers used in the preparation of the above mentioned polyacetal homopolymer or a polyacetal copolymer to conduct copolymerization. In copolymerization of (a) trioxane and (b) a compound selected from a monofunctional cyclic ether compound having no substituent and a monofunctional cyclic formal compound having no substituent, for example, addition of a monofunctional glycidyl compound having a substituent (for example, phenyl glycidyl ether, butyl glycidyl ether or others) produces a polyacetal resin with a branched structure. Copolymerization of (a) trioxane and (b) a compound is conducted with addition of a polyfunctional glycidyl ether compound to produce a polyacetal resin with a cross-linked molecular structure.

In the present invention, the (A2) polyacetal resin having a cross-linked molecular structure is preferably used in view of excellent mechanical characteristic features, particularly, co-polymerized products of 99.89-88.0% by weight of (a) trioxane, 0.1-10.0% by weight of (b) a compound selected from a monofunctional cyclic ether having no substituent and a monofunctional cyclic formal compound having no substituent and 0.01-2.0% by weight of a (c) polyfunctional glycidyl ether compound are preferable, and particularly those obtained by copolymerization of 99.68-96.00% by weight of (a) trioxane, 0.3-3.0% by weight of the (b) compound and 0.02-1.0 weigh % of a (c) polyfunctional glycidyl ether compound. In addition, the cross-linked polyacetal resin having melt index (MI) in a range of 0.1-10 g/min is preferable.

Aforementioned compounds may be enumerated as (b) compound, particularly one, two or more selected from ethylene oxide, 1,3-dioxolane, 1,4-butanediol formal and diethylene glycol formal is/are preferable.

In addition, (c) polyfunctional glycidyl ether compounds such as ethyleneglycol diglycidyl ether, propyleneglycol diglycidyl ether, 1,4-butanediol diglycidyl ether, hexamethylene glycol diglycidyl ether, resorcinol diglycidyl ether, bisphenol A diglycidyl ether, polyethyleneglycol diglycidyl ether, polypropyleneglycol diglycidyl ether, polybutyleneglycol diglycidyl ether, glycerol triglycidyl ether, trimethylol propane triglycidyl ether, pentaerythritol tetraglycidyl ether, sorbitol polyglycidyl ether, sorbitan polyglycidyl ether, polyglycerol polyglycidyl ether and diglycerol polyglycidyl ether may be enumerated. These compounds may be used singly or in combination of two or more compounds for copolymerization with (a) trioxane.

The (A2) polyacetal resins used in the present invention forming cross-linked molecular structure by copolymerization with a compound having 3 or 4 glycidyl ether groups in one molecule such as among above mentioned (c) polyfunctional glycidyl ether compounds are particularly preferable.

Practically, trimethylolpropane triglycidyl ether, glycerol triglycidyl ether and pentaerythritol tetraglycidyl ether may be enumerated as particularly preferable (c) polyfunctional glycidyl ether compounds.

The preparation process of (A2) polyacetal resins having branched or cross-linked molecular structure is not restrictive and may be prepared by publicly known methods similar to that of the (A1) polyacetal resin.

The amount of combination of the (A2) polyacetal resin having branched or cross-linked molecular structure is 0.1-20 weight parts to 100 weight parts of the (A1) polyacetal resin. A less amount of combination of the (A2) polyacetal resin results in insufficient improvement of the mechanical strength and an excess amount of combination of the (A2) polyacetal resin results in such as poor molding and processing properties leading to insufficient mechanical characteristic features. The preferred amount of combination of the (A2) polyacetal resin is 0.2-10 weight parts to 100 weight parts of the (A1) polyacetal resin, particularly preferably at 0.3-5 weight parts.

The (A2) polyacetal resins having such a branched or cross-linked molecular structure exhibit similar properties with those of the (A1) straight chain polyacetal resins having a main structural unit of oxymethylene group and further having branched or cross-linked molecular structure leads to quite different properties from those of the (A1) straight chain polyacetal resin. Combination of the (A2) polyacetal resin having such branched or cross-linked molecular structure with the (A1) straight chain polyacetal resin selectively and unexpectedly exhibited results accomplishing the object of the present invention in combination of the other action of the structural components.

Then, the (B) glass-base inorganic filler materials used in the present invention are not restrictive in their forms and fibrous (glass fiber), powdery (milled glass fiber), particle (glass beads), plate (glass flake) and hollow (glass balloon) forms may be used. A mixture of one, two or more glass-base filler material(s) having above mentioned forms may be mixed and used according to the aims.

The (B) glass-base inorganic filler materials used in the present invention are independent from the presence or absence of the surface treatment, but some glass-base inorganic filler materials without surface treatment may cause the effect of the present invention to become unstable and application of the glass-base inorganic filler materials with surface treatment is preferable to accomplish the stable various properties. As for the surface treatment agent, titanate surface treatment agent and silane surface treatment agent can be used.

As for the titanate surface treatment agents such as titanium-i-propoxyoctylene glycolate tetra-n-butoxytitanium and tetrakis(2-ethylhexoxy)titanium may be enumerated.

In addition, silane coupling agents such as vinyl alkoxysilanes, epoxyalkoxysilanes, aminoalkoxysilanes, mercaptoalkoxysilanes and allyl alkoxysilane may be enumerated.

As for vinyl alkoxysilanes, for example, vinyl triethoxysilane, vinyl trimethoxysilane, and vinyl tris(β-methoxyethoxy)silane may be enumerated.

As for epoxyalkoxysilanes such as γ-glycidoxypropyl trimethoxysilane, β-(3,4-epoxycyclohexyl)ethyl trimethoxysilane and γ-glycidoxypropyl triethoxysilane may be enumerated.

As for aminoalkoxysilanes, for example, γ-aminopropyl trimethoxysilane, γ-aminopropyl triethoxysilane, γ-aminopropyl methyl dimethoxysilane, γ-aminopropyl methyl diethoxysilane, N-(β-aminoethyl)-γ-aminopropyl trimethoxysilane and N-phenyl-γ-aminopropyl trimethoxysilane may be enumerated.

As for mercaptoalkoxysilanes, such as γ-mercaptopropyl trimethoxysilane and γ-mercaptopropyl triethoxysilane may be enumerated.

As for allyl alkoxysilanes such as γ-diallylaminopropyl trimethoxysilane, γ-allylaminopropyl trimethoxysilane and γ-allylthiopropyl trimethoxysilane may be enumerated.

These surface treatment agents are used at 0.01-20 weight parts, preferably 0.05-10 weight parts, particularly preferably 0.05-5 weight parts to 100 weight parts of the glass-base inorganic filler materials for the surface treatment.

The (B) glass-base inorganic filler materials used in the present invention, may be surface treated by any surface treatment agent and some effects can be obtained, particularly preferably a surface treated product with the aminoalkoxysilanes, and more improved mechanical characteristic features can be obtained.

In addition, when glass fiber is used as the (B) glass-base inorganic filler material, further application of a sizing agent such as a polymer binder, adhesion stimulant and other adjuvants can be suitably used. As for polymer binders, conventional publicly known common organic materials such as water dispersible/water soluble polyvinyl acetate, polyesters, epoxides, polyurethanes, polyacrylates or polyolefin resins, or their mixtures are preferably used.

In the present invention, the blending quantity the (B) glass-base inorganic filler materials maybe 3-200 weight parts, preferably 5-150 weight parts, particularly preferably 10-100 weight parts to 100 weight parts of aforementioned (A1) polyacetal resin. The blending amount less than three weight parts causes insufficient improvement in mechanical properties and over 200 weight parts makes molding and processing difficult.

The (C) boric acid compounds used in the present invention may be enumerated such as orthoboric acid, metaboric acid, tetraboric acid and diboron trioxide, and commercial products may be used. The blending quantity the (C) boric acid compound in the present invention is 0.001-3 weight parts, preferably 0.005-1 weight part, particularly preferably 0.01-0.5 weight part to 100 weight parts of the aforementioned (A1) polyacetal resin. The blending amount less than 0.001 weight part causes insufficient effect and over three weight parts causes troubles in thermal stability.

In the polyacetal resin compositions of the present invention, further blending of a (D) triazine derivative having a functional group containing nitrogen atom is preferable to further suppress the generation of formaldehyde. The (D) triazine derivatives having a functional group containing nitrogen atom are such as guanamine, melamine, N-butylmelamine, N-phenylmelamine, N,N-diphenylmelamine, N,N-diallylmelamine, N,N',N"-triphenylmelamine, benzoguanamine, acetoguanamine, 2,4-diamino-6-butyl-sym-triazine, ammeline, 2,4-diamino-6-benzyloxy-sym-triazine, 2,4-diamino-6-butoxy-sym-triazine, 2,4-diamino-6-cyxclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, 1,1-bis(3,5-diamino-2,4,6-triazinyl)methane, 1,2-bis(3,5-diamino-2,4,6-triazinyl)ethane (other name; succinoguanamine), 1,3-bis(3,5-diamino-2,4,6-triazinyl)propane, 1,4-bis(3,5-diamino-2,4,6-triazinyl)butane, methylenated melamine, ethylenedimelamine, triguanamine, melamine cyanurate, ethylene dimelamine cyanurate and triguanamine cyanurate.

These triazine derivatives may be used singly or in combinations of two or more compounds. Guanamine and melamine are preferred, and melamine is particularly preferable.

Blending of these (D) triazine derivatives having such a nitrogen containing functional group may preferably carried out at 0.001-3 weight parts to 100 weight parts of the aforementioned (A1) polyacetal resin and more preferably at 0.01-2 weight parts and particularly preferably at 0.03-1 weight part.

The polyacetal resin compositions of the present invention may further be blended with various publicly known stabilizers to reinforce their stability. As for stabilizers, one, two or more hindered phenol compounds, or hydroxides, inorganic salts and carboxylic acid salts of alkali or alkaline earth metals may be enumerated.

Various publicly known additives may be blended to improve their physical properties according to their targeted use. Examples of the additives include various coloring agents, lubricants, mold releasing agents, nuclear agents, antistatic agents and other surfactants, heteropolymers, organic improving agents and filler materials other than those used in the present invention. In addition, publicly known filler materials such as inorganic, organic and metals in fibrous, plate, granular form filler materials other than glass-base inorganic filler materials may be blended singly or in combinations of two or more materials.

The resin compositions of the present invention can be easily prepared by conventional methods, publicly known as preparation methods. For example, any preparation process such as i) blending of whole components composing the composition and supplying to a main supply port of a single or twin screw extruder, and extruding by melting and kneading (melt-kneading) followed by cutting to produce pellet-form resin composition, ii) in a similar manner with that of preparation i) except for supplying a part of component or a partial amount of the component of the composition at an intermediate position of the extruder to produce the pellet-form resin composition, iii) preparing a plurality of compositions with different components by such as melting and kneading using the extruder, mixing them and further melting and kneading, if necessary, to produce targeted compositions, iv) preparing a composition (master batch) containing high concentration of a part of components such as by melting and kneading using the extruder, mixing the master batch with the remaining components and further melting and kneading, if necessary, to produce targeted compositions, v) supplying a whole mixture of components composed by the composition or a mixture of the aforementioned master batch and the remaining components to the molding machine to produce molded articles having the targeted composition, may be used.

In the preparation of such compositions, pulverization of a part or whole of the base material polyacetal resin, blending with the other components followed by such as extrusion is preferable to give good dispersibility of the additives.

The resin compositions relating to the present invention may be molded by any one of processes of extrusion molding, injection molding, compression molding, vacuum molding, blow molding and foam molding.

EXAMPLES

Hereinafter the present invention will be more practically explained by the examples, however, the present invention is not restricted by these examples.

In addition, the (A2) branched/cross-linked polyacetal resin used in the examples described later were prepared as follows:

Preparation Examples 1-3 (Preparations of (A2-1 to A2-3) Branched/Cross-linked Polyacetal Resins)

Using a twin shaft continuous reactor equipped with a hot (cold) medium jacket, (a) trioxane, (b) a compound selected from cyclic ethers and a cyclic formals, and (c) a polyfunctional glycidyl ether compound were continuously supplied at the ratios shown in Table 1 under rotating of the twin shafts fitted with paddles at 150 rpm, respectively, and a molecular weight modifier methylol was continuously supplied to trioxane at a rate of 500 ppm, and a boron trifluoride diethyl ether complex was continuously added as a catalyst at a rate of 0.005% by weight converted as boron trifluoride to trioxane to cause mass polymerization. Warm water at 80° C. was flowed through the hot/cold medium jacket.

The reaction product exhausted from the reactor was rapidly passed through a pulverizer while adding an aqueous 0.05% by weight triethylamine solution at 60° C. to deactivate the catalyst, and further separated, washed and dried to produce crude polyacetal resin.

Then, an aqueous solution containing 5% by weight of triethylamine and pentaerythrityl tetrakis[3-(3,5-di-tert-butyl-4-hydroxyphenyl)-propionate were added at three % by weight and 0.3% by weight, respectively, to the crude polyacetal resin, melted and kneaded at 210° C. and extruded through the twin screw extruder to decompose and remove the unstable terminal part of the crude polyacetal resin to give a terminal stabilized polyacetal resin ((A2-1 to A2-3) branched or cross-linked polyacetal resin) in pellet form. The compositions of these (A2-1 to A2-3) branched/cross-linked polyacetal resins and their melt indices are shown in Table 1.

In addition, the practical names of (b) compounds and (c) compounds shown by abbreviated forms in Table 1 are as follows.

Furthermore, the melt index (MI) was determined according to ASTM D-1238 under conditions at 190° C. and 2,160 g of loading.

(b) Compound
DO: 1,3-dioxolane
BF: 1,4-butanediol formal (c) Compound
TMPTGE: trimethylolpropane triglycidyl ether Examples 1-32, Comparative Examples 1-18

Aforementioned (A2-1 to A2-3) branched- and cross-linked polyacetal resins and below mentioned (B1 to B10) various inorganic glass-base filler materials, (C1 to C3) boric acid compounds and (D1 to D3) triazine derivatives having a nitrogen containing functional group were blended at ratios shown in Table 2 to the straight chain polyacetal resin (Polyplastics Co., Ltd., Trade name Duracon® M90), and melting and kneaded using an extruder held at a cylinder temperature of 200° C. to give a pellet form composition. Then, the pellet form composition was molded using an injection molding apparatus to give test specimens and their physical properties were evaluated by the following evaluation method. The results are shown in Table 2.

While, similar pellet-form compositions were prepared without addition of the branched/cross-linked polyacetal or the boric acid compound and their physical properties were comparatively evaluated. The results are shown in Table 3.

<Tensile Strength and Elongation>
Tensile test specimens were prepared according to ISO 3167 and allowed to stand still at 23° C. and relative humidity of 50% for 48 hours and determined according to ISO 527.

<Generated Gas Amount>
A plate-form test specimen (100 mm×40 mm×2 mm: total surface area 85.6 cm$^2$) was hang at the cap of polyethylene bottle (volume 1,000 ml) containing 50 ml of distilled water, tightly sealed and allowed to stand at 60° C. for three hours in a constant temperature bath and then allowed to stand still at a room temperature for an hour. The amount of formaldehyde adsorbed in the distilled water in the polyethylene bottle was quantitatively determined according to JIS K 0102.29 (formaldehyde section), and the generated amount of formaldehyde per surface area of the test specimen was calculated.

<(B) Glass-Base Inorganic Filler Materials Used>
B1: Glass fiber surface treated with γ-aminopropyl triethoxysilane
B2: Glass fiber surface treated with titanium-i-propoxyoctylene glycolate
B3: Glass fiber of B1 further treated with an epoxide as a polymer binder
B4: Glass beads without using the surface treatment agent
B5: Glass beads surface treated with γ-aminopropyl triethoxysilane
B6: Glass beads surface treated with vinyl triethoxysilane
B7: Glass beads surface treated with γ-glycidoxypropyl triethoxyysilane
B8: Milled glass fiber without using the surface treatment agent
B9: Milled glass fiber surface treated with γ-aminopropyl triethoxysilane
B10: Glass flake surface treated with γ-aminopropyl triethoxysilane <(C) Boric Acid Compounds Used>
C1: Orthoboric acid
C2: Metaboric acid
C3: Tetraboric acid

TABLE 1

| | Branched/cross-linked polyacetal resin No. | Trioxane (a) (wt %) | Compound (b) Kind | Compound (b) (wt %) | Compound (c) Kind | Compound (c) (wt %) | Melt index (MI) (g/10 min) |
|---|---|---|---|---|---|---|---|
| Production Example 1 | A2-1 | 98.2 | DO | 1.7 | TMPTGE | 0.1 | 1.5 |
| Production Example 2 | A2-2 | 98.2 | BF | 1.7 | TMPTGE | 0.1 | 0.9 |
| Production Example 3 | A2-3 | 98.0 | DO | 1.7 | TMPTGE | 0.3 | 0.9 |

<(D) Triazine Derivatives Having a Nitrogen Containing Functional Group>
D1: Melamine
D2: Guanamine
D3: Benzoguanamine

TABLE 2

| | Resin composition | | | | | | | | | Results of physical properties | | |
|---|---|---|---|---|---|---|---|---|---|---|---|---|
| | (A1) Polyacetal resin | (A2) Branched/ Cross-linked polyacetal resin | | (B) Glass-base filler material | | (C) Boric acid compound | | (D) Triazine derivative having a nitrogen containing functional group | | Tensile strength MPa | Tensile elongation % | Generated gas amount ppm |
| | Parts by weight | Kind | Parts by weight | Kind | Parts by weight | Kind | Parts by weight | Kind | Parts by weight | | | |
| Example 1 | 100 | A2-1 | 1 | B1 | 35 | C1 | 0.05 | — | — | 127 | 2.4 | 9.3 |
| Example 2 | 100 | A2-1 | 5 | B1 | 35 | C1 | 0.05 | — | — | 141 | 2.6 | 9.5 |
| Example 3 | 100 | A2-1 | 10 | B1 | 35 | C1 | 0.05 | — | — | 153 | 2.6 | 9.8 |
| Example 4 | 100 | A2-2 | 5 | B1 | 35 | C1 | 0.05 | — | — | 138 | 2.4 | 9 |
| Example 5 | 100 | A2-3 | 5 | B1 | 35 | C1 | 0.05 | — | — | 135 | 2.3 | 9.2 |
| Example 6 | 100 | A2-1 | 5 | B2 | 35 | C1 | 0.05 | — | — | 133 | 2.4 | 8.7 |
| Example 7 | 100 | A2-1 | 5 | B3 | 35 | C1 | 0.05 | — | — | 138 | 2.5 | 8.9 |
| Example 8 | 100 | A2-1 | 5 | B4 | 35 | C1 | 0.05 | — | — | 65 | 18 | 7.5 |
| Example 9 | 100 | A2-1 | 5 | B5 | 35 | C1 | 0.05 | — | — | 68 | 17 | 7.7 |
| Example 10 | 100 | A2-1 | 5 | B6 | 35 | C1 | 0.05 | — | — | 66 | 17 | 7.7 |
| Example 11 | 100 | A2-1 | 5 | B7 | 35 | C1 | 0.05 | — | — | 67 | 16 | 7.6 |
| Example 12 | 100 | A2-1 | 5 | B8 | 35 | C1 | 0.05 | — | — | 64 | 16 | 7.4 |
| Example 13 | 100 | A2-1 | 5 | B9 | 35 | C1 | 0.05 | — | — | 68 | 18 | 8.1 |
| Example 14 | 100 | A2-1 | 5 | B10 | 35 | C1 | 0.05 | — | — | 82 | 4.9 | 7.7 |
| Example 15 | 100 | A2-1 | 5 | B1 | 35 | C1 | 0.1 | — | — | 156 | 2.5 | 13.3 |
| Example 16 | 100 | A2-1 | 5 | B1 | 35 | C2 | 0.05 | — | — | 140 | 2.5 | 9.7 |
| Example 17 | 100 | A2-1 | 5 | B1 | 35 | C3 | 0.05 | — | — | 143 | 2.6 | 9.4 |
| Example 18 | 100 | A2-1 | 5 | B1 | 35 | C1 | 0.05 | D1 | 0.15 | 144 | 2.3 | 6.8 |
| Example 19 | 100 | A2-1 | 5 | B1 | 35 | C1 | 0.05 | D1 | 1 | 146 | 2.4 | 5.1 |
| Example 20 | 100 | A2-1 | 5 | B1 | 35 | C1 | 0.05 | D2 | 0.15 | 142 | 2.2 | 6.2 |
| Example 21 | 100 | A2-1 | 5 | B1 | 35 | C1 | 0.05 | D3 | 0.15 | 140 | 2.3 | 4.3 |
| Example 22 | 100 | A2-1 | 5 | B1 | 35 | C1 | 0.05 | D1/D3 | 0.15/0.15 | 142 | 2.5 | 3.7 |
| Example 23 | 100 | A2-1 | 5 | B1 | 35 | C1 | 0.05 | D1/D3 | 0.15/1 | 136 | 2.6 | 1.8 |
| Example 24 | 100 | A2-1 | 5 | B2 | 35 | C1 | 0.05 | D1 | 0.15 | 138 | 2.5 | 7.6 |
| Example 25 | 100 | A2-1 | 5 | B3 | 35 | C1 | 0.05 | D1 | 0.15 | 142 | 2.6 | 7.3 |
| Example 26 | 100 | A2-1 | 5 | B4 | 35 | C1 | 0.05 | D1 | 0.15 | 69 | 20 | 6.4 |
| Example 27 | 100 | A2-1 | 5 | B5 | 35 | C1 | 0.05 | D1 | 0.15 | 70 | 19 | 6.5 |
| Example 28 | 100 | A2-1 | 5 | B6 | 35 | C1 | 0.05 | D1 | 0.15 | 69 | 18 | 6.6 |
| Example 29 | 100 | A2-1 | 5 | B7 | 35 | C1 | 0.05 | D1 | 0.15 | 69 | 17 | 6.2 |
| Example 30 | 100 | A2-1 | 5 | B8 | 35 | C1 | 0.05 | D1 | 0.15 | 70 | 18 | 7 |
| Example 31 | 100 | A2-1 | 5 | B9 | 35 | C1 | 0.05 | D1 | 0.15 | 74 | 19 | 7 |
| Example 32 | 100 | A2-1 | 5 | B10 | 35 | C1 | 0.05 | D1 | 0.15 | 91 | 5.2 | 6.5 |

TABLE 3

| | Resin composition | | | | | | | | | Results of physical properties | | |
|---|---|---|---|---|---|---|---|---|---|---|---|---|
| | (A1) Polyacetal resin | (A2) Branched/Cross-linked polyacetal resin | | (B) Glass-base filler material | | (C) Boric acid compound | | (D) Triazine derivative having a nitrogen containing functional group | | Tensile strength MPa | Tensile elongation % | Generated gas amount ppm |
| | Parts by weight | Kind | Parts by weight | Kind | Parts by weight | Kind | Parts by weight | Kind | Parts by weight | | | |
| Comparative Example 1 | 100 | — | — | B1 | 35 | — | — | — | — | 98 | 1.2 | 6.9 |
| Comparative Example 2 | 100 | — | — | B1 | 35 | C1 | 0.05 | — | — | 121 | 2.1 | 9.6 |
| Comparative Example 3 | 100 | — | — | B2 | 35 | C1 | 0.05 | — | — | 112 | 2 | 9 |
| Comparative Example 4 | 100 | — | — | B3 | 35 | C1 | 0.05 | — | — | 117 | 2.1 | 9.1 |
| Comparative Example 5 | 100 | — | — | B4 | 35 | C1 | 0.05 | — | — | 59 | 19 | 7.7 |
| Comparative Example 6 | 100 | — | — | B5 | 35 | C1 | 0.05 | — | — | 57 | 18 | 7.9 |
| Comparative Example 7 | 100 | — | — | B6 | 35 | C1 | 0.05 | — | — | 58 | 18 | 7.7 |
| Comparative Example 8 | 100 | — | — | B7 | 35 | C1 | 0.05 | — | — | 55 | 16 | 7.8 |
| Comparative Example 9 | 100 | — | — | B8 | 35 | C1 | 0.05 | — | — | 59 | 18 | 7.5 |
| Comparative Example 10 | 100 | — | — | B9 | 35 | C1 | 0.05 | — | — | 61 | 20 | 8 |
| Comparative Example 11 | 100 | — | — | B10 | 35 | C1 | 0.05 | — | — | 62 | 3.8 | 7.9 |
| Comparative Example 12 | 100 | A2-1 | 5 | B1 | 35 | — | — | — | — | 103 | 2.1 | 6.8 |
| Comparative Example 13 | 100 | A2-1 | 5 | B5 | 35 | — | — | — | — | 45 | 12 | 5.9 |
| Comparative Example 14 | 100 | A2-1 | 5 | B9 | 35 | — | — | — | — | 43 | 10 | 6.2 |
| Comparative Example 15 | 100 | A2-1 | 5 | B1 | 35 | — | — | D1 | 0.15 | 101 | 1.9 | 5.9 |
| Comparative Example 16 | 100 | A2-1 | 5 | B1 | 35 | C1 | 5 | D1 | 0.15 | Un-extrudable due to foaming | | |
| Comparative Example 17 | 100 | A2-1 | 5 | B1 | 35 | — | — | D1/D3 | 0.15/1 | 120 | 2.4 | 1.2 |
| Comparative Example 18 | 100 | — | — | B1 | 35 | C1 | 0.05 | D1 | 0.15 | 121 | 2.2 | 8.9 |

The invention claimed is:

1. A polyacetal resin composition comprising:
   100 parts by weight of (A1) a polyacetal resin having a substantially straight chain molecular structure;
   0.1-20 parts by weight of (A2) a polyacetal resin having a branched or cross-linked molecular structure, wherein the (A2) polyacetal resin is a cross-linked polyacetal copolymer prepared by copolymerizing 99.89 to 88.0% by weight of (a) trioxane, 0.1 to 10.0% by weight of (b) a compound selected from a cyclic ether compound having no substituent and a cyclic formal compound having no substituent, and 0.01 to 2.0% by weight of (c) a polyfunctional glycidyl ether compound, and having a melt index in a range from 0.1 to 10 g/min (determined at 190° C. and 2.16 kg of load);
   3-200 parts by weight of (B) a glass-base inorganic filler; and
   0.001 to 3 parts by weight of (C) a boric acid compound.

2. The polyacetal resin composition according to claim 1, wherein the (B) glass-base inorganic filler is glass fiber.

3. The polyacetal resin composition according to claim 1, wherein the (B) glass-base inorganic filler is selected from glass beads, milled glass fiber and glass flake.

4. The polyacetal resin composition according to claim 1, wherein the (B) glass-base inorganic filler is one treated by aminoalkoxysilane on the surface thereof.

5. The polyacetal resin composition according to claim 1, wherein the (A1) polyacetal resin is a polyacetal copolymer prepared by copolymerizing 99.9 to 90.0% by weight of (a) trioxane with 0.1 to 10.0% by weight of (b) a compound selected from a cyclic ether compound having no substituent and a cyclic formal compound having no substituent, and having a melt index in a range from 1 to 50 g/min (determined at 190° and 2.16 kg of load).

6. The polyacetal resin composition according to claim 1, wherein the (c) polyfunctional glycidyl ether compound is one having three or four glycidyl groups.

7. The polyacetal resin composition according to claim 1, wherein the (c) polyfunctional glycidyl ether compound is selected from trimethylol propane triglycidyl ether, glycerol triglycidyl ether and pentaerythritol tetraglycidyl ether.

8. The polyacetal resin composition according to claim 5, wherein the (b) compound is one or two or more selected from ethylene oxide, 1,3-dioxolane, 1,4-butanediol formal and diethylene glycol formal.

9. The polyacetal resin composition according to claim 1, wherein the (c) boric acid compound is at least one selected from orthoboric acid, metaboric acid, tetraboric acid and diboron trioxide.

10. The polyacetal resin composition according to claim 1, further comprising 0.001 to 3 parts by weight of (D) a triazine derivative having a functional group containing nitrogen to 100 parts by weight of the (A1).

* * * * *